(12) United States Patent
Miller et al.

(10) Patent No.: US 10,773,245 B2
(45) Date of Patent: Sep. 15, 2020

(54) CRYSTALLINE TRANSITION METAL MOLYBDOTUNGSTATE

(71) Applicant: UOP LLC, Des Plaines, IL (US)

(72) Inventors: Stuart R. Miller, Arlington Heights, IL (US); Susan C. Koster, Carpentersville, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/106,400

(22) Filed: Aug. 21, 2018

(65) Prior Publication Data

US 2019/0060873 A1    Feb. 28, 2019

Related U.S. Application Data

(60) Provisional application No. 62/550,207, filed on Aug. 25, 2017.

(51) Int. Cl.
    *B01J 23/888*      (2006.01)
    *B01J 37/20*      (2006.01)
    (Continued)

(52) U.S. Cl.
    CPC ........... *B01J 23/8885* (2013.01); *B01J 21/04* (2013.01); *B01J 21/08* (2013.01); *B01J 21/12* (2013.01);
    (Continued)

(58) Field of Classification Search
    CPC ........ B01J 23/8885; B01J 21/04; B01J 21/08; B01J 21/12; B01J 23/002; B01J 23/885; B01J 35/002; B01J 37/0009; B01J 37/03; B01J 37/031; B01J 37/04; B01J 37/08; B01J 37/20; C10G 11/04; C10G 29/16; C10G 45/08; C10G 45/50; C10G 45/60; C10G 47/06
See application file for complete search history.

(56) References Cited

U.S. PATENT DOCUMENTS 4,820,677 A    4/1989    Jacobson et al.
4,904,634 A    2/1990    Wieserman et al.
(Continued)

FOREIGN PATENT DOCUMENTS

CA    2719157 A1    10/2009
CA    2620656 C    3/2014
(Continued)

OTHER PUBLICATIONS

Amaya, "Unsupported sulfides obtained from high specific area mixed oxides as hydrotreating catalysts", Revista Facultad de Ingenieria, Universidad de Antioquia (2010), 56, 58-67, Language: Spanish, Database: CAPLUS.
(Continued)

*Primary Examiner* — James A Fiorito

(57) ABSTRACT

A hydroprocessing catalyst has been developed. The catalyst is a crystalline transition metal molybdotungstate material or metal sulfides derived therefrom, or both. The hydroprocessing using the crystalline transition metal molybdotungstate material may include hydrodenitrification, hydrodesulfurization, hydrodemetallation, hydrodesilication, hydrodearomatization, hydroisomerization, hydrotreating, hydrofining, and hydrocracking.

6 Claims, 1 Drawing Sheet

(51) Int. Cl.

| | | |
|---|---|---|
| *C10G 45/50* | (2006.01) | |
| *C10G 45/08* | (2006.01) | |
| *C10G 45/60* | (2006.01) | |
| *C10G 47/06* | (2006.01) | |
| *B01J 37/03* | (2006.01) | |
| *B01J 35/00* | (2006.01) | |
| *B01J 21/04* | (2006.01) | |
| *B01J 21/08* | (2006.01) | |
| *B01J 21/12* | (2006.01) | |
| *B01J 23/00* | (2006.01) | |
| *B01J 23/885* | (2006.01) | |
| *B01J 37/00* | (2006.01) | |
| *B01J 37/04* | (2006.01) | |
| *B01J 37/08* | (2006.01) | |
| *C10G 11/04* | (2006.01) | |
| *C10G 29/16* | (2006.01) | |

(52) U.S. Cl.
CPC ......... *B01J 23/002* (2013.01); *B01J 23/885* (2013.01); *B01J 35/002* (2013.01); *B01J 37/0009* (2013.01); *B01J 37/03* (2013.01); *B01J 37/031* (2013.01); *B01J 37/04* (2013.01); *B01J 37/08* (2013.01); *B01J 37/20* (2013.01); *C10G 11/04* (2013.01); *C10G 29/16* (2013.01); *C10G 45/08* (2013.01); *C10G 45/50* (2013.01); *C10G 45/60* (2013.01); *C10G 47/06* (2013.01); *B01J 2523/00* (2013.01); *B01J 2523/68* (2013.01); *B01J 2523/69* (2013.01); *B01J 2523/845* (2013.01); *B01J 2523/847* (2013.01)

(56) References Cited

U.S. PATENT DOCUMENTS

| | | | |
|---|---|---|---|
| 5,278,121 A | 1/1994 | Singhal et al. | |
| 6,156,695 A | 12/2000 | Soled et al. | |
| 6,162,350 A | 12/2000 | Soled et al. | |
| 6,197,273 B1 | 3/2001 | Nagano et al. | |
| 6,280,610 B1 | 8/2001 | Uragami et al. | |
| 6,299,760 B1 | 10/2001 | Soled et al. | |
| 6,534,437 B2 | 3/2003 | Eijsbouts et al. | |
| 6,582,590 B1 | 6/2003 | Riley et al. | |
| 6,620,313 B1 | 9/2003 | Demmin et al. | |
| 6,635,599 B1 | 10/2003 | Eijsbouts et al. | |
| 6,652,738 B2 | 11/2003 | Eijsbouts et al. | |
| 6,712,955 B1 | 3/2004 | Hou et al. | |
| 6,783,663 B1 | 8/2004 | Riley et al. | |
| 6,863,803 B1 | 3/2005 | Riley et al. | |
| 6,929,738 B1 | 8/2005 | Riley et al. | |
| 7,229,548 B2 | 6/2007 | Riley et al. | |
| 7,232,515 B1 | 6/2007 | Demmin et al. | |
| 7,232,934 B2 | 6/2007 | Saleh et al. | |
| 7,288,182 B1 | 10/2007 | Soled et al. | |
| 7,513,989 B1 | 4/2009 | Soled et al. | |
| 7,538,066 B2 | 5/2009 | Soled et al. | |
| 7,544,632 B2 | 6/2009 | Soled et al. | |
| 7,591,942 B2 | 9/2009 | Soled et al. | |
| 7,605,107 B2 | 10/2009 | Soled et al. | |
| 7,608,558 B2 | 10/2009 | Eijsbouts et al. | |
| 7,648,941 B2 | 1/2010 | Soled et al. | |
| 7,686,943 B2 | 3/2010 | Soled et al. | |
| 7,691,257 B2 | 4/2010 | Shih et al. | |
| 7,709,412 B2 | 5/2010 | Shih et al. | |
| 7,749,937 B2 | 7/2010 | Domokos et al. | |
| 7,776,205 B2 | 8/2010 | Soled et al. | |
| 7,780,845 B2 | 8/2010 | Soled et al. | |
| 7,951,746 B2 | 5/2011 | Bai et al. | |
| 8,062,508 B2 | 11/2011 | Soled et al. | |
| 8,067,331 B2 | 11/2011 | Eijsbouts-Spickova et al. | |
| 8,080,492 B2 | 12/2011 | Kuperman et al. | |
| 8,173,570 B2 | 5/2012 | Maesen et al. | |
| 8,206,575 B2 | 6/2012 | Maesen et al. | |
| 8,216,958 B2 | 7/2012 | Wu et al. | |
| 8,318,628 B2 | 11/2012 | Brun et al. | |
| 8,343,887 B2 | 1/2013 | Maesen et al. | |
| 8,377,289 B2 | 2/2013 | Li et al. | |
| 8,383,543 B2 | 2/2013 | Maesen et al. | |
| 8,586,500 B2 | 11/2013 | Kuperman et al. | |
| 8,636,967 B2 | 1/2014 | Canelon et al. | |
| 8,846,560 B2 | 9/2014 | Yang et al. | |
| 2008/0280754 A1 | 11/2008 | Toledo Antonio et al. | |
| 2009/0114566 A1 | 5/2009 | Chen et al. | |
| 2009/0127165 A1* | 5/2009 | Eijsbouts-Spickova ..................... B01J 37/0009 208/216 R |
| 2012/0065056 A1 | 3/2012 | Domokos et al. | |
| 2012/0122653 A1 | 5/2012 | Maesen et al. | |
| 2012/0122659 A1 | 5/2012 | Kuperman et al. | |
| 2012/0172199 A1 | 7/2012 | Yang et al. | |
| 2013/0068662 A1 | 3/2013 | Maesen et al. | |
| 2013/0337996 A1 | 12/2013 | Eijsbouts-Spickova et al. | |
| 2014/0027350 A1 | 1/2014 | Soled et al. | |
| 2015/0292095 A1 | 10/2015 | Haber et al. | |
| 2017/0165644 A1 | 6/2017 | Miller et al. | |
| 2017/0165645 A1 | 6/2017 | Miller et al. | |
| 2017/0165646 A1 | 6/2017 | Miller et al. | |
| 2017/0165647 A1 | 6/2017 | Miller et al. | |
| 2017/0165648 A1 | 6/2017 | Miller et al. | |
| 2017/0165649 A1 | 6/2017 | Miller et al. | |
| 2017/0165650 A1 | 6/2017 | Miller et al. | |
| 2017/0165651 A1 | 6/2017 | Miller et al. | |
| 2017/0165652 A1 | 6/2017 | Miller et al. | |
| 2017/0165656 A1 | 6/2017 | Miller et al. | |
| 2017/0166605 A1 | 6/2017 | Miller et al. | |
| 2017/0218528 A1 | 8/2017 | Zhang et al. | |
| 2018/0169633 A1 | 6/2018 | Millet et al. | |
| 2019/0060882 A1 | 2/2019 | Millet et al. | |

FOREIGN PATENT DOCUMENTS

| | | |
|---|---|---|
| CN | 102049265 A | 5/2011 |
| EP | 2103347 A1 | 9/2009 |
| RU | 2098181 C1 | 12/1997 |
| WO | 200042126 A1 | 7/2000 |
| WO | 2009061295 A1 | 5/2009 |
| WO | 2014033653 A2 | 3/2014 |

OTHER PUBLICATIONS

An, "Preparation of unsupported and mesoporous Ni—Mo—W sulfide catalysts by low temperature solid-state reaction", Journal of China University of Petroleum (Edition of Natural Science), v 31, n 6, p. 156-160, Dec. 2007, ISSN: 16735005; Publisher: Ed. Off. Journal of the Univ. Petroleum, China. Language: Chinese.

Calderon-Magdaleno, "Effect of the amount of citric acid used in the preparation of NiMo/SBA-15 catalysts on their performance in HDS of dibenzothiophene-type compounds", Catalysis Today, v 220-222, p. 78-88, Mar. 2014; ISSN: 09205861; DOI: 10.1016/j.cattod.2013.06.002; Publisher: Elsevier.

Escobar, "Effect of ethylene glycol addition on the properties of P-doped NiMo/Al2O3 HDS catalysts: Part I. Materials preparation and characterization", Applied Catalysis B: Environmental, v 88, n 3/4, p. 564-575, May 20, 2009; ISSN: 09263373; DOI: 10.1016/j.apcatb.2008.10.005; Publisher: Elsevier.

Gil-Llambias, "Hydrodesulfurization Catalysts Electrophoretic Study Of Mo (Or W)-Co, Mo (Or W)-Ni, And Mo (or W)-Ca Sulfided Phases", J. Catal., v 102, n 1, p. 37-42, Nov. 1986; ISSN: 00219517; Publisher: Academic Press.

Levin, "Crystal Structure of an Ammonium Nickel Molybdate Prepared by Chemical Precipitation", Inorg. Chem. 1996, 35, 4191-4197.

Nava, "Effect of phosphorus addition on unsupported Ni—Mo—W sulfide catalysts prepared by the in situ activation of nickel/tetramethylammonium thiomolybdotungstate", Applied Catalysis A: General, v 303, n 2, p. 177-184, Apr. 28, 2006; ISSN: 0926860X; DOI: 10.1016/j.apcata.2005.12.025; Publisher: Elsevier.

(56) References Cited

OTHER PUBLICATIONS

Nikulshin, "Influence of nature of precursors of aluminum nickel molybdenum catalysts on their performance in hydrodesulfurization", Neftekhimiya, v 46, n 5, p. 371-376, 2006; Language: Russian; ISSN: 00282421; Publisher: East View Publications.

Olivas, "Trimetallic NiMoW unsupported catalysts for HDS", ACS Division of Petroleum Chemistry, Inc. Preprints, v 50, n 4, p. 372-374, Aug. 2005; ISSN: 05693799; Publisher: American Chemical Society.

Yin, "A novel porous ammonium nickel molybdate as the catalyst precursor towards deep hydrodesulfurization of gas oil", p. 873-878, 2013, ISSN: 0016-2361, Publisher: Elsevier Science.

Yin, "Mechanism of Hydrodesulfurization of dibenzothiophenes on unsupported NiMoW catalyst", Journal of Fuel Chemistry and Technology, v 41, n 8, p. 991-997, Aug. 2013; ISSN: 18725813; DOI: 10.1016/S1872-5813(13)60043-2; Publisher: Science Press.

Zhang, "Solution synthesis of unsupported Ni—W—S hydrotreating catalysts", Catalysis Communications 8 (2007) 2232-2237.

Zhou, "Study on hydrodesulfurization process of diesel on unsupported catalyst", Petroleum Processing and Petrochemicals, v 44, n 10, p. 38-43, Oct. 2013; Language: Chinese; ISSN: 10052399; Publisher: Research Institute of Petroleum Processing, SINOPEC.

Clearfield, "Studies in Heavy-Metal Molybdates. I. Crystal Structure of a Basic Zinc Molybdate, NaZn2OH(H20)(Mo04)21a", Inorganic Chemistry, vol. 15, No. 2, 1976, 335-338.

Clearfield, "Preparation and Structure of Manganese Molybdates", Inorg. Chem. 1985, 24, 4606-4609.

Clearfield, "Studies in Heavy-Metal Molybdates. 2. Crystal Structure of Disodium Di-u-hydroxo-dizin(II) Molybdate", Inorganic Chemistry, vol. 16, No. 3, 1977, 628-631.

Duan, "Ternary Ni—Co—Mo oxy-hydroxide nanoflakes grown on carbon cloth for excellent supercapacitor electrodes", Materials Letters 208 (2017) 65-68.

Hsu, "Synthesis and characterization of mesoporous Ni—Co oxy-hydroxides for pseudocapacitor application", Electrochimica Acta 94 (2013) 104-112.

Lien, "High-performance asymmetric supercapacitor consisting of Ni—Co—Cu oxy-hydroxide nanosheets and activated carbon", Electrochemistry Communications 34 (2013) 323-326.

Xiao, "Remarkable improvement of the turn-on characteristics of a Fe2O3 photoanode for photoelectrochemical water splitting with coating a FeCoW oxy-hydroxide gel", Applied Catalysis B: Environmental 212 (2017) 89-96.

\* cited by examiner

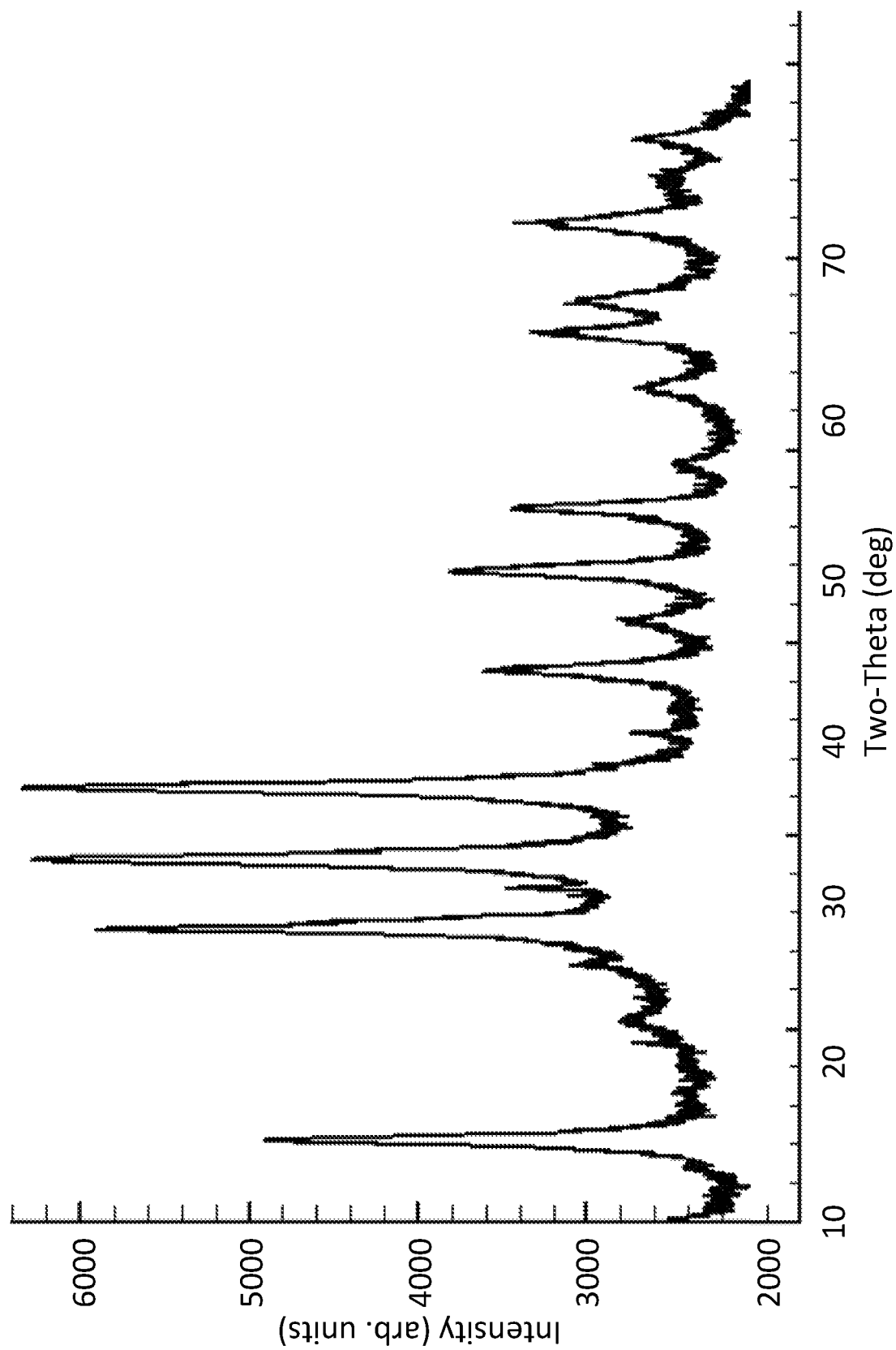

CRYSTALLINE TRANSITION METAL MOLYBDOTUNGSTATE

CROSS-REFERENCE TO RELATED APPLICATION

This application claims priority from U.S. Provisional Application No. 62/550,207 filed Aug. 25, 2017, the contents of which cited application are hereby incorporated by reference in its entirety.

FIELD OF THE INVENTION

This invention relates to a new hydroprocessing catalyst. More particularly this invention relates to a crystalline transition metal molybdotungstate and its use as a hydroprocessing catalyst. Hydroprocessing may include hydrodenitrification, hydrodesulfurization, hydrodemetallation, hydrodesilication, hydrodearomatization, hydroisomerization, hydrotreating, hydrofining, and hydrocracking.

BACKGROUND

In order to meet the growing demand for petroleum products there is greater utilization of sour crudes, which when combined with tighter environmental legislation regarding the concentration of nitrogen and sulfur within fuel, leads to accentuated refining problems. The removal of sulfur (hydrodesulfurization—HDS) and nitrogen (hydrodenitrification—HDN) containing compounds from fuel feed stocks is targeted during the hydrotreating steps of refining and is achieved by the conversion of organic nitrogen and sulfur to ammonia and hydrogen sulfide respectively.

Since the late 1940s the use of catalysts containing nickel (Ni) and molybdenum (Mo) or tungsten (W) have demonstrated up to 80% sulfur removal. See for example, V. N. Ipatieff, G. S. Monroe, R. E. Schaad, Division of Petroleum Chemistry, 115th Meeting ACS, San Francisco, 1949. For several decades now there has been an intense interest directed towards the development of materials to catalyze the deep desulfurization, in order to reduce the sulfur concentration to the ppm level. Some recent breakthroughs have focused on the development and application of more active and stable catalysts targeting the production of feeds for ultra low sulfur fuels. Several studies have demonstrated improved HDS and HDN activities through elimination of the support such as, for example, $Al_2O_3$. Using bulk unsupported materials provides a route to increase the active phase loading in the reactor as well as providing alternative chemistry to target these catalysts.

More recent research in this area has focused on the ultra deep desulfurization properties achieved by a Ni—Mo/W unsupported 'trimetallic' material reported in, for example, U.S. Pat. No. 6,156,695. The controlled synthesis of a broadly amorphous mixed metal oxide consisting of molybdenum, tungsten and nickel, significantly outperformed conventional hydrotreating catalysts. The structural chemistry of the tri-metallic mixed metal oxide material was likened to the hydrotalcite family of materials, referring to literature articles detailing the synthesis and characterization of a layered nickel molybdate material, stating that the partial substitution of molybdenum with tungsten leads to the production of a broadly amorphous phase which, upon decomposition by sulfidation, gives rise to superior hydrotreating activities.

The chemistry of these layered hydrotalcite-like materials was first reported by H. Pezerat, contribution à l'étude des molybdates hydrates de zinc, cobalt et nickel, C. R. ACAD. SCI., 261, 5490, who identified a series of phases having ideal formulas $MMoO_4.H_2O$, $EHM_2O^-(MoO_4)_2.H_2O$, and $E_{2-x}(H_3O)_xM_2O(MoO_4)_2$ where E can be $NH_4^+$, $Na^+$ or $K^+$ and M can be $Zn^{2+}$, $Co^{2+}$ or $Ni^{2+}$.

Pezerat assigned the different phases he observed as being Φc, Φy or Φy and determined the crystal structures for Φx and Φy, however owing to a combination of the small crystallite size, limited crystallographic capabilities and complex nature of the material, there were doubts raised as to the quality of the structural assessment of the materials. During the mid 1970s, Clearfield et al attempted a more detailed analysis of the Φx and Φy phases, see examples A. Clearfield, M. J. Sims, R. Gopal, INORG. CHEM., 15, 335; A. Clearfield, R. Gopal, C. H. Saldarriaga-Molina, INORG. CHEM., 16, 628. Single crystal studies on the product from a hydrothermal approach allowed confirmation of the Φx structure, however they failed in their attempts to synthesize Φy and instead synthesized an alternative phase, Na—Cu(OH)($MoO_4$), see A. Clearfield, A. Moini, P. R. Rudolf, INORG. CHEM., 24, 4606.

The structure of Φy was not confirmed until 1996 when by Ying et al. Their investigation into a room temperature chimie douce synthesis technique in the pursuit of a layered ammonium zinc molybdate led to a metastable aluminum-substituted zincite phase, prepared by the calcination of Zn/Al layered double hydroxide ($Zn_4Al_2(OH)_{12}CO_3.zH_2O$). See example D. Levin, S. L. Soled, J. Y. Ying, INORG. CHEM., 1996, 35, 4191-4197. This material was reacted with a solution of ammonium heptamolybdate at room temperature to produce a highly crystalline compound, the structure of which could not be determined through conventional ab-initio methods. The material was indexed, yielding crystallographic parameters which were the same as that of an ammonium nickel molybdate, reported by Astier, see example M. P. Astier, G. Dji, S. Teichner, J. ANN. CHIM. (Paris), 1987, 12, 337, a material belonging to a family of ammonium-amine-nickel-molybdenum oxides closely related to Pezerat's materials. Astier did not publish any detailed structural data on this family of materials, leading to Ying et al reproducing the material to be analyzed by high resolution powder diffraction in order to elucidate the structure. Ying et al named this class of materials 'layered transition-metal molybdates' or LTMs.

SUMMARY OF THE INVENTION

A crystalline transition metal molybdotungstate material has been produced and optionally sulfided, to yield an active hydroprocessing catalyst. The crystalline transition metal molybdotungstate material has a unique x-ray powder diffraction pattern showing peaks at 6.2, 3.5 and 3.1 Å. The crystalline transition metal molybdotungstate material has the formula:

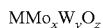

where 'M' is a metal selected from Mn, Fe, Co, Ni, V, Cu, Zn, Sn, Sb, Ti, Zr, and mixtures thereof; 'x' varies from 0.001 to 2, or from 0.01 to 1, or from 0.1 to 0.5; 'y' varies from 0.4 to 3, or from 0.5 to 2 or from 0.6 to 1; 'z' is a number which satisfies the sum of the valency of M, x and y; the material is further characterized by a unique x-ray powder diffraction pattern showing peaks at the d-spacings listed in Table A:

TABLE A

| d (Å) | I/I$_0$ (%) |
|---|---|
| 6.20 | s |
| 3.52 | vs |
| 3.12 | vs |
| 2.74 | vs |
| 2.41 | s |
| 2.33 | s |
| 2.09 | vs |
| 1.93 | m |

Another embodiment involves a method of making a crystalline transition metal molybdotungstate material having the formula:

$$MMo_xW_yO_z$$

where 'M' is a metal selected from Mn, Fe, Co Ni, V, Cu, Zn, Sn, Sb, Ti, Zr, and mixtures thereof; 'x+y' varies between 0.4 to 2.5, or from 0.5 to 1.5, or from 0.6 to 1; 'x' varies from 0.0001 to 0.75, or from 0.01 to 0.6, or from 0.1 to 0.4; 'z' is a number which satisfies the sum of the valency of M, x and y; the material is further characterized by a unique x-ray powder diffraction pattern showing peaks at the d-spacings listed in Table A:

TABLE A

| d (Å) | I/I$_0$ (%) |
|---|---|
| 6.20 | s |
| 3.52 | vs |
| 3.12 | vs |
| 2.74 | vs |
| 2.41 | s |
| 2.33 | s |
| 2.09 | vs |
| 1.93 | m | wherein the method comprises: forming a reaction mixture containing water, a source of M, a source of Mo, source of W, and optionally a solubilizing agent, complexing agent, chelating agent, or a mixture thereof; optionally removing a component from the reaction mixture to generate an intermediate reaction mixture wherein the component is a precipitate, or at least a portion of the water, or both a precipitate and a portion of the water; reacting the reaction mixture or the intermediate mixture at a temperature from about 25° C. to about 500° C. for a period of time from about 30 minutes to 14 days to generate the crystalline transition metal molybdotungstate material; and recovering the crystalline transition metal molybdotungstate material.

Yet another embodiment involves a conversion process comprising contacting a sulfiding agent with a material to generate metal sulfides which are contacted with a feed at conversion conditions to generate at least one product, the material comprising: a crystalline transition metal molybdotungstate material having the formula:

$$MMo_xW_yO_z$$

where 'M' is a metal selected from Mn, Fe, Co Ni, V, Cu, Zn, Sn, Sb, Ti, Zr, and mixtures thereof; 'x+y' varies between 0.4 to 2.5, or from 0.5 to 1.5, or from 0.6 to 1; 'x' varies from 0.0001 to 0.75, or from 0.01 to 0.6, or from 0.1 to 0.4; 'z' is a number which satisfies the sum of the valency of M, x and y; the material is further characterized by a unique x-ray powder diffraction pattern showing peaks at the d-spacings listed in Table A:

Additional features and advantages of the invention will be apparent from the description of the invention, FIGURE and claims provided herein.

BRIEF DESCRIPTION OF THE DRAWING

The FIGURE is the x-ray powder diffraction pattern of a crystalline transition metal molybdotungstate prepared by the method as described in the examples.

DETAILED DESCRIPTION OF THE INVENTION

The present invention relates to a crystalline transition metal molybdotungstate composition and a process for preparing the composition. The material has the designation UPM-19. This composition has an empirical formula:

$$MMo_xW_yO_z$$

where 'M' is a metal selected from Mn, Fe, Co, Ni, V, Cu, Zn, Sn, Sb, Ti, Zr, and mixtures thereof; 'x+y' varies between 0.4 to 2.5, or from 0.5 to 1.5, or from 0.6 to 1; 'x' varies from 0.0001 to 0.75, or from 0.01 to 0.6, or from 0.1 to 0.4; 'z' is a number which satisfies the sum of the valency of M, x and y.

The crystalline composition of the invention is characterized by having an extended network of M-O-M, where M represents a metal, or combination of metals listed above. The structural units repeat itself into at least two adjacent unit cells without termination of the bonding. The composition can have a one-dimensional network, such as, for example, linear chains.

The crystalline transition metal molybdotungstate composition is further characterized by a unique x-ray powder diffraction pattern showing peaks at the d-spacings listed in Table A.

TABLE A

| d (Å) | I/I0 (%) |
|---|---|
| 6.20 | s |
| 3.52 | vs |
| 3.12 | vs |
| 2.74 | vs |
| 2.41 | s |
| 2.33 | s |
| 2.09 | vs |
| 1.93 | m |

The crystalline transition metal molybdotungstate composition of the invention is yet further characterized by the x-ray powder diffraction pattern shown in the FIGURE.

The crystalline transition metal molybdotungstate composition can be prepared by solvothermal crystallization of a reaction mixture, typically by mixing reactive sources of molybdenum and tungsten with the appropriate source of metal 'M'. Depending upon the metals sources selected, the reaction mixture may optionally include a solubilizing agent "SA" in order to facilitate the dissolution of the metals. The reaction mixture may also optionally include a complexing agent, a chelating agent, or both a complexing agent and a chelating agent "CA" in order to react with the metals prior to formation of the product.

Specific examples of suitable molybdenum sources include but are not limited to molybdenum trioxide, ammonium dimolybdate, ammonium thiomolybdate, and ammonium heptamolybdate. Suitable specific examples of the tungsten source include but are not limited to tungsten trioxide, ammonium ditungstate, ammonium thiotungstate, ammonium heptatungstate, ammonium paratungstate, tungstic acid, tungsten oxytetrachloride, tungsten hexachloride, hydrogen tungstate, sodium ditungstate, sodium metatungstate, sodium paratungstate and ammonium metatungstate. Sources of other metals "M" include but are not limited to the respective halide, acetate, nitrate, carbonate, thiols and hydroxide salts. Specific examples include nickel chloride, cobalt chloride, nickel bromide, zinc chloride, copper chloride, iron chloride, magnesium chloride, cobalt bromide, magnesium chloride, nickel nitrate, cobalt nitrate, iron nitrate, manganese nitrate, zinc nitrate, copper nitrate, iron nitrate, nickel acetate, cobalt acetate, iron acetate, copper acetate, zinc acetate, nickel carbonate, cobalt carbonate, zinc carbonate, manganese carbonate, copper carbonate, iron carbonate, nickel hydroxide, cobalt hydroxide, manganese hydroxide, copper hydroxide, zinc hydroxide, titanium oxide, manganese oxide, copper oxide, zinc oxide, cobalt oxide, nickel oxide, iron oxide, titanium tetrachloride, tin sulfate, zinc sulfate, iron sulfate, tin chloride pentahydrate, antimony chloride, antimony acetate, vanadium chloride.

Specific examples of the optional solubilizing agent "SA" include, but are not limited to, organic acids such as citric acid, malic acid, maleic acid, aliphatic acids; mineral acids such as sulfuric acid, hydrochloric acid, nitric acid, phosphoric acid and boric acid. Specific examples of the optional complexing or chelating agents include, but are not limited to, ammonium hydroxide, ammonium carbonate, ammonium bicarbonate, ammonium chloride, ammonium fluoride, ethylenediaminetetraacetic acid, ethylenediamine, methylamine, dimethylamine or a combination thereof.

Generally, the solvothermal process used to prepare the composition of this invention involves forming a reaction mixture wherein all of the sources of the metal components, such as for example, Ni, Mo and W are mixed together, with the optional addition of either a solubilizing agent or a complexing agent or both. The reaction may be at ambient temperatures or at elevated temperatures. The pressure may be atmospheric pressure or autogenous pressure. The vessel used may be a closed vessel or an open vessel. In one embodiment, the reactants are then mixed intermittently at elevated temperatures.

By way of specific examples, a reaction mixture may be formed which in terms of molar ratios of the oxides is expressed by the formula:

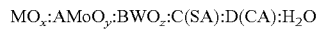

$MO_x:AMoO_y:BWO_z:C(SA):D(CA):H_2O$ where 'M' is selected from the group consisting of iron, cobalt, nickel, manganese, vanadium, copper, zinc, tin, titanium, zirconium, antimony and mixtures thereof; 'x' is a number which satisfies the valency of 'M'; 'A' represents the ratio of 'Mo' relative to 'M' and varies from 0.0001 to 0.75, or from 0.01 to 0.6, or from 0.1 to 0.4; 'y' is a number satisfies the valency of 'Mo'; 'B' represents the ratio of 'W' relative to 'M' and varies from 0.3999 to 2.4999, or from 0.5 to 2, or from 0.7 to 1.25; 'z' is a number satisfies the valency of 'W'; 'C' represents the ratio of the solubilizing agent (SA) relative to 'M' and varies from 0 to 50, or from 0.1 to 25, or from 1 to 10; 'D' represents the ratio of the complexing agent (CA) relative to 'M' and varies from 0 to 100, or from 0.1 to 50, or from 5 to 20; the ratio of $H_2O$ and varies from 0.1 to 1000, or from 1 to 100, or from 2 to 20. If required, the starting reagents may be pretreat be either the addition of a complexing agent such as, but not limited to, ammonium hydroxide or citric acid. Depending upon the metal reagents selected, the pH of the mixture may adjusted to an acidic or basic regime. The pH of the mixture may be adjusted through the addition of a base such as $NH_4OH$, quaternary ammonium hydroxides, amines, and the like, or conversely be a mineral acid such as nitric acid, hydrochloric acid, sulfuric acid hydrofluoric acid, or an organic acid such as citric acid or malic acid.

In one embodiment, an intermediate reaction mixture may be formed by removing a component of the reaction mixture wherein the component is a precipitate, or at least a portion of the water, or both a precipitate and at least a portion of the water mixture. The intermediate may then reacted as the reaction mixture at a temperature from about 25° C. to about 500° C. for a period of from about 30 minutes to 14 days to generate the crystalline transition metal molybdotungstate compositions.

Once the reaction mixture is formed, the reaction mixture is reacted at temperatures ranging from about 25° C. to about 500° C. for a period of time ranging from 30 minutes to around 14 days. In one embodiment, the temperate range for the reaction is from about 300° C. to about 400° C. and in another embodiment the temperature is in the range of from about 100° C. to about 200° C. In one embodiment, the reaction time is from about 4 to about 6 hours, and in another embodiment the reaction time is from about 4 to 7 days. The reaction is carried out under atmospheric pressure in an open vessel or in a sealed vessel under autogenous pressure. The crystalline transition metal molybdotungstate compositions are recovered as the reaction product. The crystalline transition metal molybdotungstate compositions are characterized by their unique x-ray powder diffraction pattern as shown in Table A above and in the FIGURE.

Once formed, the crystalline transition metal molybdotungstate may have a binder incorporated, where the binder may be, for example, silicas, aluminas, silica aluminas, and mixtures thereof. The selection of binder includes but is not limited to, anionic and cationic clays such as hydrotalcites, pyroaurite-sjogrenite-hydrotalcites, montmorillonite and related clays, kaolin, sepiolites, silicas, aluminas such as (pseudo) boehomite, gibbsite, flash calcined gibbsite, eta-alumina, zicronica, titania, alumina coated titania, silica-alumina, silica coated alumina, alumina coated silicas and mixtures thereof, or other materials generally known as particle binders in order to maintain particle integrity. These binders may be applied with or without peptization. The binder may be added to the bulk crystalline transition metal molybdotungstate composition, and the amount of binder may range from about 1 to about 30 wt % of the finished catalysts or from about 5 to about 26 wt % of the finished catalyst. The binder may be chemically bound to the crystalline transition metal molybdotungstate composition, or may be present in a physical mixture with the crystalline transition metal molybdotungstate composition.

At least a portion of the crystalline transition metal molybdotungstate composition, with or without a binder, or before or after inclusion of a binder, can be sulfided in situ in an application or pre-sulfided to form metal sulfides which in turn are used in an application as a catalyst. The sulfidation may be conducted under a variety of sulfidation conditions such as through contact of the crystalline transition metal molybdotungstate composition with a sulfiding agent such as sulfur-containing stream or feedstream, or a gaseous mixture of $H_2S/H_2$, or both. The sulfidation of the crystalline transition metal molybdotungstate composition may be performed at elevated temperatures, typically ranging from about 50° C. to about 600° C., or from about 150° C. to about 500° C., or from about 250° C. to about 450° C. The materials resulting from the sulfiding step, the decomposition products, are referred to as metal sulfides which can be used as catalysts in conversion processes. As noted above, at least a portion of the metal sulfides may be present in a mixture with at least one binder. The sulfiding step can take place at a location remote from other synthesis steps, remote from the location of the conversion process, or remote from both the location of synthesis and remote from location of the conversion process.

As discussed, at least a portion of the crystalline transition metal molybdotungstate composition can be sulfided and the resulting metal sulfides may be used as a catalyst or catalyst support in conversion processes such as various hydrocarbon conversion processes. Hydroprocessing processes is one class of hydrocarbon conversion processes in which the crystalline transition metal molybdotungstate material is useful as a catalyst. Examples of specific hydroprocessing processes are well known in the art and include hydrodenitrification, hydrodesulfurization, hydrodemetallation, hydrodesilication, hydrodearomatization, hydroisomerization, hydrotreating, hydrofining, and hydrocracking. In one embodiment, a conversion process comprises contacting the crystalline mixed transition metal tungstate with a sulfiding agent to generate metal sulfides which are contacted with a feed stream at conversion conditions to generate at least one product.

The operating conditions of the hydroprocessing processes listed above typically include reaction pressures from about 2.5 MPa to about 17.2 MPa, or in the range of about 5.5 to about 17.2 MPa, with reaction temperatures in the range of about 245° C. to about 440° C., or in the range of about 285° C. to about 425° C. Time with which the feed is in contact with the active catalyst, referred to as liquid hour space velocities (LHSV), should be in the range of about 0.1 $h^{-1}$ to about 10 $h^{-1}$, or about 2.0 $h^{-1}$ to about 8.0 $h^{-1}$. Specific subsets of these ranges may be employed depending upon the feedstock being used. For example, when hydrotreating a typical diesel feedstock, operating conditions may include from about 3.5 MPa to about 8.6 MPa, from about 315° C. to about 410° C., from about 0.25/h to about 5/h, and from about 84 $Nm^3$ $H_2/m^3$ to about 850 $Nm^3$ $H_2/m^3$ feed. Other feedstocks may include gasoline, naphtha, kerosene, gas oils, distillates, and reformate.

Any of the lines, conduits, units, devices, vessels, surrounding environments, zones or similar used in the process or in the method of making may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes or methods described herein.

Examples are provided below so that the invention may be described more completely. These examples are only by way of illustration and should not be interpreted as a limitation of the broad scope of the invention, which is set forth in the claims.

Patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Powder samples were pressed flat into a plate and continuously scanned from 3° and 70° (2θ). Interplanar spacings (d) in Angstrom units were obtained from the position of the diffraction peaks expressed as θ, where θ is the Bragg angle as observed from digitized data. Intensities were determined from the integrated area of diffraction peaks after subtracting background, "$I_O$" being the intensity of the strongest line or peak, and "I" being the intensity of each of the other peaks. As will be understood by those skilled in the art the determination of the parameter 2θ is subject to both human and mechanical error, which in combination can impose an uncertainty of about ±0.4° on each reported value of 2θ. This uncertainty is also translated to the reported values of the d-spacings, which are calculated from the 2θ values. In some of the x-ray patterns reported, the relative intensities of the d-spacings are indicated by the notations vs, s, m, and w, which represent very strong, strong, medium, and weak, respectively. In terms of 100(I/$I_0$), the above designations are defined as:

w=0.01-15, m=15-60: s=60-80 and vs=80-100.

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present. As will be understood to those skilled in the art, it is possible for different poorly crystalline materials to yield peaks at the same position. If a material is composed of multiple poorly crystalline materials, then the peak positions observed individually for each poorly crystalline material would be observed in the resulting summed diffraction pattern. Likewise, it is possible to have some peaks appear at the same positions within different, single phase, crystalline materials, which may be simply a reflection of a similar distance within the materials and not that the materials possess the same structure.

Example 1

Ammonium metatungstate hydrate (17.71 g, 0.07 moles of W) and ammonium heptamolybdate tetrahydrate (5.3 g, 0.03 moles of Mo) were dissolved in 150 ml of DI $H_2O$, concentrated ammonium hydroxide (25 mL, 30%) was added to this solution. A second solution was prepared by adding nickel nitrate hexahydrate (43.62 g, 0.15 moles of Ni) to 150 ml of DI $H_2O$. The two solutions were slowly mixed together over with the pH of the final solution being adjusted to pH 6.8 using a mild $HNO_3$ solution. The precipitated generated was isolated by filtration, washed with hot water and then heat treated for using a ramp rate of 2° C. per hour until the temperature reach 400° C. The material was kept at 300° C. for 24 hours. The resulting product was analyzed by X-ray powder diffraction, and the X-ray powder diffraction pattern is shown in the FIGURE.

Example 2

Using a ceramic dish, ammonium hydroxide (10 ml, 30%) was added to nickel carbonate hydrate (10.14 g, 0.1 moles of Ni) over a 30 minute period. Ammonium metatungstate hydrate (17.71 g, 0.07 moles of W) and ammonium heptamolybdate tetrahydrate (1.76 g 0.01 moles of Mo) were added and the resultant mixture was mixed thoroughly and then heat treated for 12 hours at 150° C. with intermittent mixing. The mixture was then heat treated further at 350° C. for 24 hours. The resulting product was analyzed by X-ray powder diffraction, and the X-ray powder diffraction pattern is shown in the FIGURE.

Example 3

Using a ceramic dish, nickel nitrate hexahydrate (14.54 g, 0.05 moles of Ni), zinc nitrate hexahydrate (14.87 g, 0.05 moles of Zn), ammonium metatungstate hydrate (17.71 g, 0.07 moles of W) and ammonium heptamolybdate tetrahydrate (1.76 g 0.01 moles of Mo) were added together and the resultant mixture was mixed thoroughly before being heat treated for 12 hours at 150° C. with intermittent mixing. The mixture was then heat treated further at 350° C. for 24 hours. The resulting product was analyzed by X-ray powder diffraction, and the X-ray powder diffraction pattern is shown in the FIGURE.

Example 4

Using a ceramic dish, nickel nitrate hexahydrate (29.75 g, 0.1 moles of Ni) and ammonium metatungstate hydrate (17.71 g, 0.07 moles of W) and ammonium heptamolybdate tetrahydrate (7.06 g 0.04 moles of Mo) were added together and the resultant mixture was mixed thoroughly before being heat treated for 12 hours at 150° C. with intermittent mixing. The mixture was then heat treated further at 300° C. for 24 hours. The resulting product was analyzed by X-ray powder diffraction, and the X-ray powder diffraction pattern is shown in the FIGURE.

Example 5

Nickel nitrate hexahydrate (100 g, 0.34 moles of Ni), zinc nitrate (3.63 g, 0.03 moles of Zn), ammonium metatungstate hydrate (60.5 g, 0.24 moles of W), ammonium heptamolybdate tetrahydrate (1.76 g 0.01 moles of Mo) and ammonium carbonate (82.5 g, 0.86 moles) were mixed together in a covered beaker and heated at 50° C. for 4 days with intermittent mixing. The mixture was then transferred to a ceramic dish and was heated at 70° C. for 1 day, before being heated to 120° C. The mixture was then heated for 1 hour at 10° C. intervals from 120° C. to 190° C., after which the material was heated at 200° C. for 24 hrs. The resulting product was analyzed by X-ray powder diffraction, and the X-ray powder diffraction pattern is shown in the FIGURE.

Specific Embodiments

Embodiment 1 is a crystalline transition metal molybdotungstate material having the formula:

$$MMo_xW_yO_z$$

where 'M' is a metal selected from Mn, Fe, Co, Ni, V, Cu, Zn, Sn, Sb, Ti, Zr, and mixtures thereof; 'x+y' varies between 0.4 to 2.5, or from 0.5 to 1.5, or from 0.6 to 1; 'x' varies from 0.0001 to 0.75, or from 0.01 to 0.6, or from 0.1 to 0.4; 'z' is a number which satisfies the sum of the valency of M, x and y; the material is further characterized by a unique x-ray powder diffraction pattern showing peaks at the d-spacings listed in Table A:

TABLE A

| d (Å) | I/I0 (%) |
|---|---|
| 6.20 | s |
| 3.52 | vs |
| 3.12 | vs |
| 2.74 | vs |
| 2.41 | s |
| 2.33 | s |
| 2.09 | vs |
| 1.93 | m |

Another embodiment is the crystalline transition metal molybdotungstate material of embodiment 1 wherein the crystalline transition metal molybdotungstate material is present in a mixture with at least one binder and wherein the mixture comprises up to 25 wt-% binder.

Another embodiment is any of the previous crystalline transition metal molybdotungstate materials wherein the binder is selected from the group consisting of silicas, aluminas, silica-aluminas, and mixtures thereof.

Another embodiment is any of the previous crystalline transition metal molybdotungstate materials wherein M is nickel or cobalt.

Another embodiment is any of the previous crystalline transition metal molybdotungstate materials wherein M is nickel.

Another embodiment is any of the previous crystalline transition metal molybdotungstate materials wherein the crystalline transition metal molybdotungstate material is sulfided.

Embodiment 2 is a method of making a crystalline transition metal molybdotungstate material having the formula:

$$MMo_xW_yO_z$$

where 'M' is a metal selected from Mn, Fe, Co, Ni, V, Cu, Zn, Sn, Sb, Ti, Zr, and mixtures thereof; 'x+y' varies between 0.4 to 2.5, or from 0.5 to 1.5, or from 0.6 to 1; 'x' varies from 0.0001 to 0.75, or from 0.01 to 0.6, or from 0.1 to 0.4; 'z' is a number which satisfies the sum of the valency of M, x and y; the material is further characterized by a unique x-ray powder diffraction pattern showing peaks at the d-spacings listed in Table A:

TABLE A

| d (Å) | I/I0 (%) |
|---|---|
| 6.20 | s |
| 3.52 | vs |
| 3.12 | vs |
| 2.74 | vs |
| 2.41 | s |
| 2.33 | s |
| 2.09 | vs |
| 1.93 | m | the method comprising: (a) forming a reaction mixture containing water, a source of M, a source of Mo, a source of W, and optionally a solubilizing agent, complexing agent, chelating agent, or a mixture thereof; (b) optionally removing a component from the reaction mixture to generate an intermediate reaction mixture wherein the component is a precipitate, or at least a portion of the water, or both a precipitate and a portion of the water; (c) reacting the reaction mixture or the intermediate mixture at a temperature from about 25° C. to about 500° C. for a period of time from about 30 minutes to 14 days to generate the crystalline transition metal molybdotungstate material; and (d) recovering the crystalline transition metal molybdotungstate material.

Another embodiment is the method of embodiment 2 wherein the recovering is by filtration or centrifugation.

Another embodiment is any of the previous methods method of making the crystalline transition metal molybdotungstate material further comprising adding a binder to the recovered crystalline transition metal molybdotungstate material.

Another embodiment is any of the previous methods method of making the crystalline transition metal molybdotungstate material wherein the binder is selected from the group consisting of aluminas, silicas, alumina-silicas, and mixtures thereof.

Another embodiment is any of the previous methods method of making the crystalline transition metal molybdotungstate material further comprising sulfiding the recovered crystalline transition metal molybdotungstate material.

Another embodiment is any of the previous methods method of making the crystalline transition metal molybdotungstate material wherein the reacting is conducted under atmospheric pressure or autogenous pressure.

Another embodiment is any of the previous methods method of making the crystalline transition metal molybdotungstate material further comprising intermittent mixing during the reacting.

Another embodiment is any of the previous methods method of making the crystalline transition metal molybdotungstate material wherein the temperature is varied during the reacting.

Embodiment 3 is a conversion process comprising contacting a material with a sulfiding agent to convert at least a portion of the material to metal sulfides and contacting the metal sulfides with a feed at conversion conditions to generate at least one product, wherein the material comprises a crystalline transition metal molybdotungstate material having the formula:

$$MMo_xW_yO_z$$

where 'M' is a metal selected from Mn, Fe, Co, Ni, V, Cu, Zn, Sn, Sb, Ti, Zr, and mixtures thereof; 'x+y' varies between 0.4 to 2.5, or from 0.5 to 1.5, or from 0.6 to 1; 'x' varies from 0.0001 to 0.75, or from 0.01 to 0.6, or from 0.1 to 0.4; 'z' is a number which satisfies the sum of the valency of M, x and y; the material is further characterized by a unique x-ray powder diffraction pattern showing peaks at the d-spacings listed in Table A:

TABLE A

| d (Å) | I/I0 (%) |
|---|---|
| 6.20 | s |
| 3.52 | vs |
| 3.12 | vs |
| 2.74 | vs |
| 2.41 | s |
| 2.33 | s |
| 2.09 | vs |
| 1.93 | m |

Another embodiment is embodiment 3 wherein the conversion process is hydroprocessing.

Another embodiment is wherein the conversion process is selected from the group consisting of hydrodenitrification, hydrodesulfurization, hydrodemetallation, hydrodesilication, hydrodearomatization, hydroisomerization, hydrotreating, hydrofining, and hydrocracking.

Another embodiment is any of the previous conversion processes wherein the crystalline transition metal molybdotungstate material is present in a mixture with at least one binder and wherein the mixture comprises up to about 25 wt-% binder.

Another embodiment is any of the previous conversion processes wherein the crystalline transition metal molybdotungstate material is sulfided.

Another embodiment is embodiment 2 or 3 further comprising at least one of: sensing at least one parameter of the process or method and generating a signal or data from the sensing; or generating and transmitting a signal; or generating and transmitting data.

The invention claimed is:

1. A crystalline transition metal molybdotungstate material having the formula:

$$MMo_xW_yO_z$$

where 'M' is a metal selected from Mn, Fe, Co, Ni, V, Cu, Zn, Sn, Sb, Ti, Zr, and mixtures thereof; 'x+y' varies between 0.4 to 2.5; 'x' varies from 0.0001 to 0.75; 'z' is a number which satisfies the sum of the valency of M, x and y; the material is further characterized by a unique x-ray powder diffraction pattern showing peaks at the d-spacings listed in Table A:

TABLE A

| d (Å) | I/I0 (%) |
|---|---|
| 6.20 | s |
| 3.52 | vs |
| 3.12 | vs |
| 2.74 | vs |
| 2.41 | s |
| 2.33 | s |
| 2.09 | vs |
| 1.93 | m |

2. The crystalline transition metal molybdotungstate material of claim 1 wherein the crystalline transition metal molybdotungstate material is present in a mixture with at least one binder and wherein the mixture comprises up to 25 wt-% binder.

3. The crystalline transition metal molybdotungstate material of claim 2 wherein the binder is selected from the group consisting of silicas, aluminas, and silica-aluminas.

4. The crystalline transition metal molybdotungstate material of claim 1 wherein M is nickel or cobalt.

5. The crystalline transition metal molybdotungstate material of claim 1 wherein M is nickel.

6. The crystalline transition metal molybdotungstate material of claim 1 wherein the crystalline transition metal molybdotungstate material is sulfided.

* * * * *